Feb. 6, 1934. W. F. HUGHES 1,946,144
FLEXIBLE DAMPER CLUTCH PLATE ASSEMBLY
Filed May 18, 1932
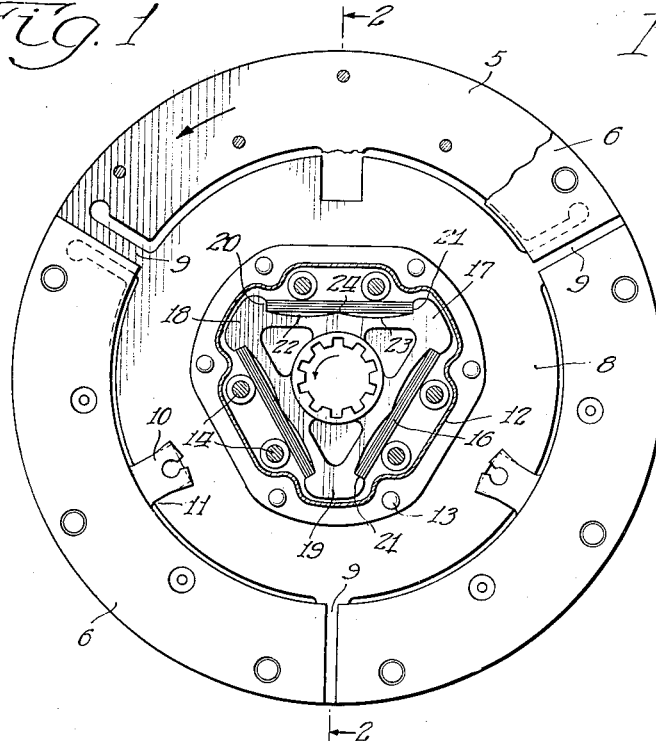
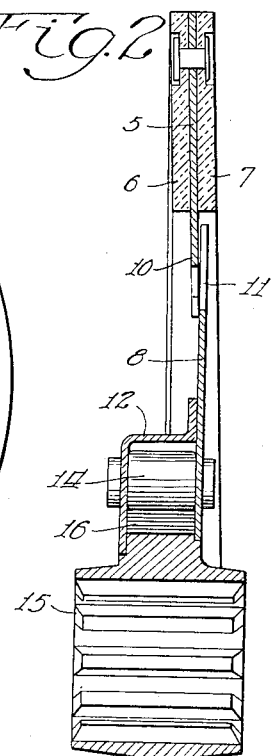
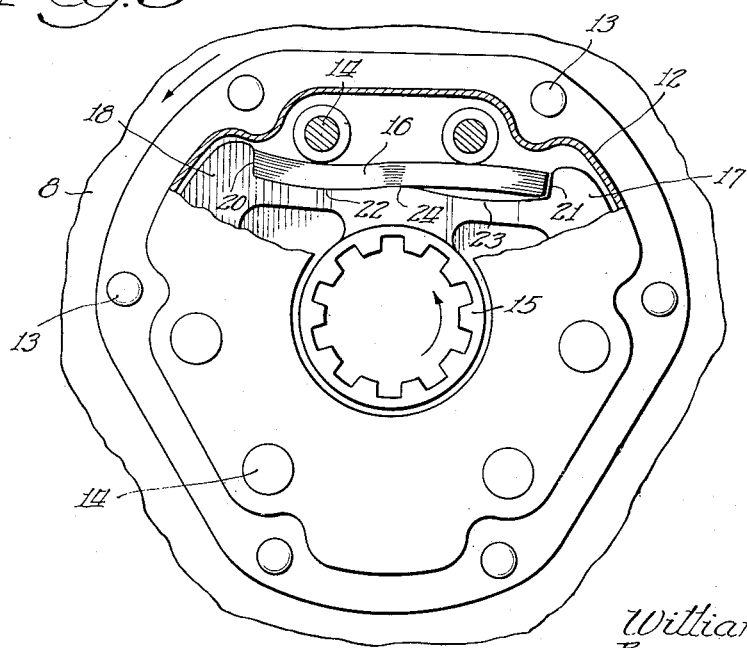
Inventor
William F. Hughes
By
Gabel & Banning Attys Patented Feb. 6, 1934

1,946,144

UNITED STATES PATENT OFFICE 1,946,144

FLEXIBLE DAMPER CLUTCH PLATE ASSEMBLY

William F. Hughes, Chicago, Ill., assignor to Perfection Gear Co., Chicago, Ill., a corporation of Illinois Application May 18, 1932. Serial No. 611,998

12 Claims. (Cl. 192—68)

My invention relates to clutches and particularly to clutches for automobiles and the like. In these clutches various arrangements have been made for providing a permissible limited rotational movement between the hub member and the friction member of the clutch. If the entire clutch is rigid from the friction member to the hub, shocks and vibrations are communicated directly from the driving members through the clutch to the driven member.

It is the object of this invention to provide a clutch with a novel vibration damping means which permits a limited rotational movement between the hub and the friction part of the clutch, but which opposes this movement in either direction in a novel manner.

It is also an object of this invention to provide in a structure of this character means for utilizing a spring in such a fashion that the distortion thereof is evenly distributed and of such a small amount as to prevent damage to the spring over a long period of time.

Other objects and advantages of the invention will appear as the description proceeds in connection with the accompanying drawing. It is to be understood, however, that the drawing and description are illustrative only and are not to be taken as limiting the invention except in so far as it is limited by the claims.

In the drawing—

Fig. 1 is a plan view partly in section of a clutch plate embodying my invention;

Fig. 2 is a section substantially on the line 2—2 of Fig. 1; and

Fig. 3 is an enlarged fragmentary side view partly in section illustrating the action of the clutch plate under driving force.

Referring now in detail to the drawing, the clutch plate is made up of the outer portion 5 bearing friction rings 6 and 7, and the inner portion 8, these two portions preferably being connected together for example by the sections 9 and having the overlapping portions at 10 and 11 in the manner described in my copending application Serial No. 611,997, filed May 18, 1932, on cushion clutch plate.

The inner portion 8 has a housing member 12 securely fastened thereto as by riveting for example at 13 and also by means of the driving lugs 14 arranged in pairs about the center of the clutch plate approximately 120° apart. These members 14 cooperate with the hub 15 and the springs 16 to form a driving connection between the hub and the clutch plate proper that allows for a certain amount of yield and also acts to damp any vibrations and to prevent their transmission through the clutch from one member to another regardless of whether the drive is through the hub to the facings 7 and 8 or through the facings to the hub.

In the normal operation of an automobile, the driving members driven from the engine grip the facings 6 and 7 and transmit power through the clutch plate to a driven member on which the hub 15 is fixed. However, when the car is driving the engine, for example in coasting down a hill or in using the engine to slow up the car, the power is then from the hub 15 through the clutch plate to the facings 6 and 7. It will be noted that the hub has the driving portions 17, 18, and 19 fixed thereto, and these portions are cut away as indicated to provide shoulders such as 20 and 21 between which the spring 16, preferably consisting of a plurality of leaf springs, is seated. Intermediate the driving members such as 17, 18, and 19, the hub is cut out as indicated at 22 and 23 and has a central bearing point at 24. The member 16 fits between the lugs 14, the shoulders 20 and 21, and the fulcrum point 24. Preferably it is under tension when so placed. Being housed between the member 12 and the clutch plate 8, the springs, of course, are held in position without a chance to escape.

Now, when the force is applied for example in the direction of the outer arrow in Figs. 1 and 3, the natural tendency is to turn the clutch plate and the housing member 12 about the hub 15. Such turning will actually take place owing to the fact that the spring member 16 may be compressed or bent and thus allow relative rotational movement within limits between the hub and the clutch plate.

Comparing Figs. 1 and 3, it will be seen that the spring member 16 has been distorted in Fig. 3 allowing the member 14, shown at the left in Fig. 3, to move down and to the left thus compressing the spring into the seat at 22. This causes the spring on the opposite side of the fulcrum 24 to bend up as the right hand lug 14 moves to the left and away from its corresponding seat 23 so that both the right hand and left hand sections of the member 16 are really opposing this rotational movement of the clutch plate about the hub. The action is also a sort of wedging action owing to the fact that there is a shift of the members 14 lengthwise along the spring member 16.

This combined wedging and bending movement has a very good damping action on any vibrations that may be communicated to the clutch plate from the engine, and, conversely, if sudden jolts are communicated to the hub through the driven shaft, this same wedging action would tend to damp them out and prevent their being communicated directly to the drive shaft.

It is believed to be evident that the leaf springs making up the member 16 need be distorted but a very small amount with this arrangement. Moreover, the pressure is not always applied at the same point but is shifted as it increases lengthwise along the spring. Moreover, pressure is applied on both sides of the fulcrum 24 although the pressure is applied to the concave side of the spring on the one side of the fulcrum and to the convex side on the other side of the fulcrum which distributes the strain over the length of the spring and tends to prolong the life thereof. The driving members 17, 18, and 19 will, of course, engage the housing 12 should the springs for any reason fail to hold and thus a positive limit is provided for the amount of movement between the hub and the clutch plate.

While I have shown this invention as applied to a clutch plate of the type shown in my copending application, it is obvious that it is not limited thereto, but may be used with any suitable type of clutch or similar mechanism where a yielding damping driving connection is desired.

Having thus described one specific form of my invention, what I claim as new and desire to secure by Letters Patent is:

1. In a clutch, a clutch plate, a hub, and a yielding driving connection therebetween comprising an elongated resilient member supported at three spaced points and a pair of spaced drive members bearing against said resilient member between its points of support, said members being so positioned on the hub and plate that angular movement between the hub and plate urges one of the drive members toward and the other away from the resilient member.

2. In a clutch, a clutch plate, a hub, and a yielding driving connection therebetween comprising an elongated resilient member supported at three spaced points and a pair of spaced drive members bearing against said resilient member between its points of support, said members being so positioned on the hub and plate that an angular movement between the hub and plate urges the drive members lengthwise and transversely of the resilient member.

3. In a clutch, a clutch plate, a hub, and a yielding driving connection therebetween comprising an elongated resilient member supported at three spaced points, and a pair of spaced drive members bearing against said resilient member between its points of support.

4. In a clutch, a clutch plate, a hub, and a yielding driving connection therebetween comprising an elongated resilient member supported at three spaced points, and a pair of spaced drive members bearing against said resilient member between its points of support, said resilient member being non-rotatably mounted on the hub, and said drive members being secured to the plate.

5. In a clutch, a clutch plate, a hub, and a yielding driving connection therebetween comprising an elongated resilient member supported at three spaced points, and a pair of spaced drive members bearing against said resilient member between its points of support, and a housing member cooperating with the plate to hold said members against lateral displacement.

6. In a clutch, a clutch plate, a hub, and a yielding driving connection therebetween comprising an elongated resilient member supported at its ends and its center, and a pair of spaced drive members bearing against said resilient member between its points of support.

7. In a clutch, a clutch plate, a hub, and a yielding driving connection therebetween comprising an elongated resilient member supported at three spaced points, and a pair of spaced drive members bearing against said resilient member between its points of support, and means opposite the drive members limiting the lateral movement of said resilient member.

8. In a clutch, a clutch plate, a hub, and a yielding driving connection therebetween comprising an elongated resilient member supported at three spaced points, and a pair of spaced drive members bearing against said resilient member between its points of support, said hub having a backing for said member limiting the flexing of said member under the pressure from said drive members.

9. In a clutch, a clutch plate, a hub, and a yielding driving connection therebetween comprising an elongated resilient member supported at three spaced points, and a pair of spaced drive members bearing against said resilient member between its points of support, said hub and said plate having means positively preventing rotation of the plate on the hub in case of failure or removal of said resilient member.

10. In a clutch, a clutch plate, a hub, and a yielding driving connection therebetween comprising an elongated resilient member supported at three spaced points, and a pair of spaced drive members bearing against said resilient member between its points of support, said hub and said plate having means positively preventing rotation of the plate on the hub in case of failure or removal of said resilient member, said means including said drive members.

11. In a clutch, a clutch plate, a hub having elongated resilient members mounted thereon and supported thereby at spaced points, said hub having projections providing shoulders at the ends of said resilient members for confining the resilient members, said projections extending outwardly beyond the resilient members, and drive members on the clutch plate bearing against the resilient members between their points of support, said drive members comprising rollers pivoted on the plate and rolling on the resilient members.

12. In a clutch, a clutch plate, a hub, and a yielding driving connection therebetween comprising an elongated resilient member supported at three spaced points, and a pair of spaced drive rollers bearing against said resilient member between its points of support, said resilient member being non-rotatably mounted on the hub, and said drive rollers being secured to the plate.

WILLIAM F. HUGHES.